United States Patent [19]

Wischmeier

[11] 3,927,900
[45] Dec. 23, 1975

[54] INDEPENDENT STEERING AXLE SUSPENSION

[76] Inventor: Thomas Harry Wischmeier, 4989 Countryside Road, Lyndhurst, Ohio 44124

[22] Filed: Aug. 5, 1974

[21] Appl. No.: 494,419

[52] U.S. Cl............ 280/124 A; 280/96.2 R; 267/60
[51] Int. Cl.² ........................................ B60G 11/14
[58] Field of Search....... 280/124 A, 96.2 R; 267/60

[56] References Cited
UNITED STATES PATENTS

| 2,026,018 | 12/1935 | Butterworth | 280/124 A X |
| 2,801,112 | 7/1957 | Piper | 280/96.2 R |
| 2,801,113 | 7/1957 | Piper | 280/96.2 R |

Primary Examiner—Philip Goodman

[57] ABSTRACT

An independent steering axle suspension for vehicles which consists of a frame bracket, a pin which is fixed to the frame bracket, a support member which can rotate and translate on the pin, a stub axle which is fixed to the support member, and one or more spring members located between the pin and the support member. The spring supports the weight of the vehicle and reduces the intensity of forces caused by uneven road surfaces, but it is not required to position the axle horizontally.

8 Claims, 3 Drawing Figures

INDEPENDENT STEERING AXLE SUSPENSION

This invention relates in general to vehicle suspension mechanisms and more particularly to independent steering axle suspensions.

This suspension may be described in connection to heavy duty truck or truck-tractor motor vehicles but it is to be understood that my invention applies to vehicles of all types.

Heavy duty trucks and truck-tractors presently utilize a solid beam front steering axle with a leaf spring suspension system. The leaf springs in this particular arrangement serve the following functions; they support the vehicle's static weight and attenuate dynamic forces and deflections caused by irregular road surfaces, they position the axle horizontally in both the longitudinal and transverse directions, and they resist the torque produced by the front wheel brakes. The solid beam front steering axle mounted on leaf springs has been successfully used for heavy duty trucks and truck-tractors since the very early days of such vehicles, and this general arrangement dominates this application today since it has proved to be both reliable and economical. The Federal Motor Vehicle Safety Standard 121 (to become effective in 1975 for highway trucks and truck-tractors) imposes new design parameters upon heavy duty highway vehicle brake systems. This standard requires vehicle performance limits which will significantly increase the braking effort required at the front wheels and this in turn will cause extensive deformation of the leaf springs. The effect of this deformation is twofold. First, the stress level in the spring is increased causing reduced fatigue life for the spring. Second, the "S" shape that the spring assumes during braking causes the caster angle of the king pin to change resulting in decreased steering control. In light of the shortcomings of the current suspension systems as affected by impending laws, a new front steering axle suspension concept was developed.

In the suspension described in this invention, the spring member is isolated from both braking torque and horizontal axle positioning forces, and the forces to the spring are directed along a single axis. The spring is required only to support the static and dynamic weight of the vehicle and to attenuate the road surface induced shock and vibration. The caster and camber angles are constant throughout the suspension travel providing uniform steering control.

It is an object of my invention to provide a suspension in which the spring member supports only the weight of the vehicle and it is not required to resist the torque produced from brake applications.

Another object of my invention is to provide a suspension where the caster and camber angles are constant throughout the entire displacement of the suspension.

Another object of my invention is to provide a suspension which will retain steering control in the event of a spring failure.

Another object of my invention is to provide a reduction of forces and displacements transferred to the vehicle resulting from road surface irregularities.

Another object of my invention is to provide a light weight suspension mechanism.

Other objects and advantages will further become apparent herein and in the drawings, in which.

Figure 1:
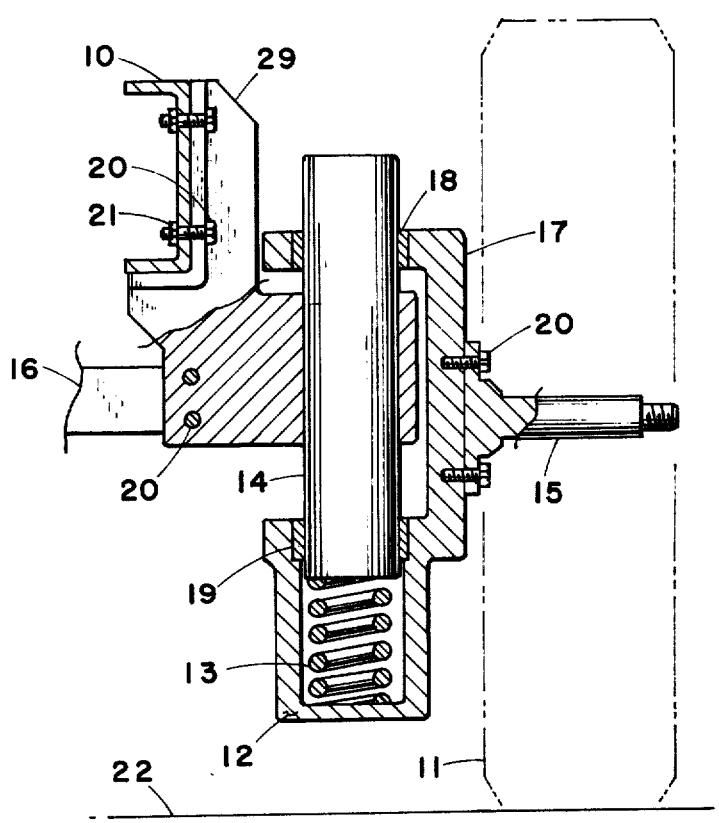
FIG. 1 is a sectioned front view of an independent steering axle suspension constructed in accordance with this invention showing the relative arrangement of the suspension mechanism to the vehicle frame and the tire.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiments of the invention illustrated in the drawing, FIG. 1 shows the relative position of the suspension to vehicle frame 10 and tire 11. The suspension consists of frame bracket 29, pin 14, support member 12, spring 13, stub axle 15, and crossmember 16.

Support member 12 consists of spring bracket 17, upper bearing 18, and lower bearing 19. Spring bracket 17 is rigidly attached to stub axle 15 by bolts 20 or by any other suitable means (not shown). Upper bearing 18 and lower bearing 19 are held in spring bracket 17 by a press (also called interference) fit or other suitable means (not shown).

Frame bracket 29 is rigidly attached to vehicle frame 10 by bolts 20 and nuts 21 or by other suitable means (not shown).

Pin 14 is guided through upper bearing 18 and lower bearing 19, and pin 14 is rigidly fixed by suitable means (not shown) to frame bracket 29 to prevent relative motion (either rotation or translation) between the two parts.

Spring 13 is located between support member 12 and pin 14 and may be any common construction such as mechanical, elastomeric, pneumatic, hydraulic, or pneumatic-hydraulic.

Stub axle 15 is connected to tire 11 by normally used wheel attachment means which typically consists of bearing, nuts, brake drums, wheels, and rims (not shown).

Crossmember 16 is rigidly attached to frame bracket 29 on each side of the vehicle by bolts 20 or other suitable means (not shown).

In operation, the vehicle's weight is carried from vehicle frame 10, through frame bracket 29, pin 14, spring 13, support member 12, stub axle 15, and tire 11 to road surface 22. Pin 14 allows support member 12 to exhibit rectilinear translation along and rotation about a common axis. This axis is approximately vertical with the angle off of vertical in the longitudinal direction being commonly called caster and the angle off of vertical in the transverse direction being commonly called camber. Spring 13 is used to attenuate displacements and dynamic forces produced when the vehicle transverses uneven road surfaces 22. The optimum spring rate, either constant or progressive, can be selected knowing the weight and weight distribution of the vehicle so that the desired ride properties (displacement and natural frequency) can be achieved. Crossmember 16 is a dual function structural member, serving both to resist the bending moment produced by the tire offset and as a vehicle chassis crossmember.

Figure 2:
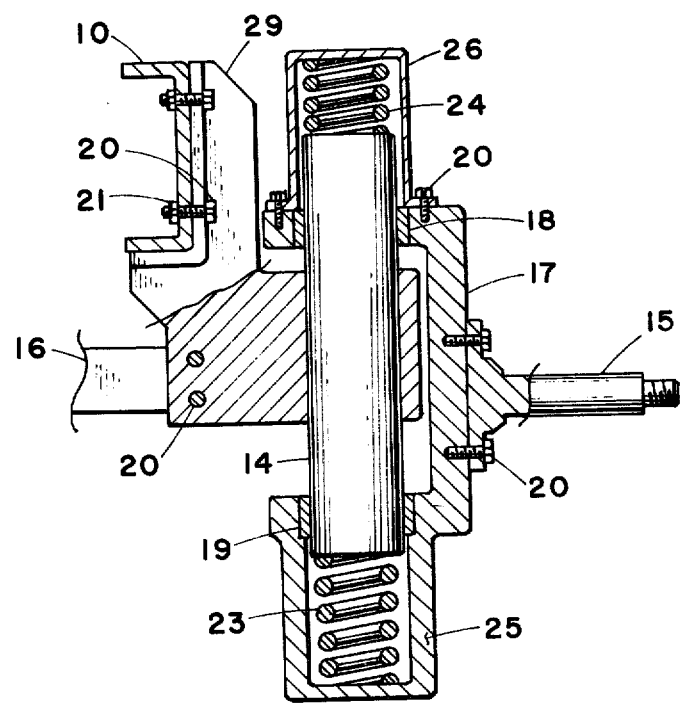
FIG. 2 is a sectioned front view of another embodiment of the present invention which utilizes two springs.

The embodiment shown in FIG. 2 is similar to the embodiment shown in FIG. 1 and described above with the following exceptions: load spring 23 and rebound spring 24 functionally replace spring 13 shown in FIG. 1, and support structure 25 has cap 26 in addition to the parts outlined for support member 12 shown in FIG. 1.

Load spring 23 is located between the bottom of pin 14 and support structure 25, and rebound spring 24 is located between the top of pin 14 and support structure 25. Both load spring 23 and rebound spring 24 may be of any construction described above and the two springs may be constructed from the same or different materials.

Support structure 25 consists of spring bracket 17, upper bearing 18, lower bearing 19, and cap 26. Cap 26 may be attached with bolts 20 to spring bracket 17 or by any other suitable means (not shown).

Other parts shown in FIG. 2 have been described above.

In operation, the embodiment shown in FIG. 2 functions the same as the embodiment shown in FIG. 1 except that rebound spring 24 resists and is compressed by the rebound forces produced when stub axle 15 is moving down with respect to the frame, and load spring 23 resists and is compressed by loading forces when stub axle 15 is moving up with respect to vehicle frame 10.

Figure 3:
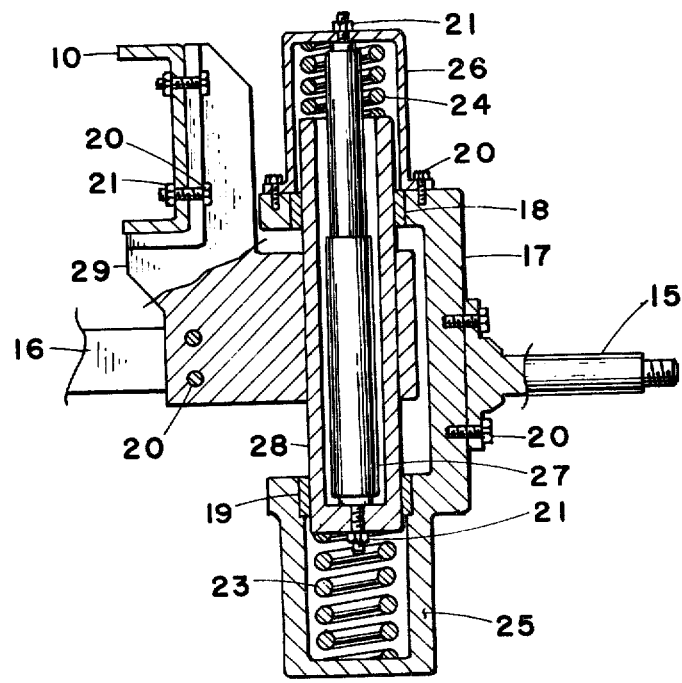
FIG. 3 is a sectioned front view of a third embodiment of the present invention which utilizes two springs and a shock absorber assembly.

The embodiment shown in FIG. 3 is similar to that shown in FIG. 2 except for tubular pin 28 and shock absorber assembly 27 which has been added inside tubular pin 28.

Shock absorber assembly 27 is attached to tubular pin 28 and cap 26 by nuts 21 as shown or by other suitable means (not shown).

Other parts shown in FIG. 3 have been described in the descriptions for FIGS. 1 and 2.

In operation, the embodiment shown in FIG. 3 operates the same as the embodiment shown in FIG. 2 except that shock absorber 27 provides damping for the spring mass system of the vehicle when using spring materials having low internal damping characteristics.

The advantages of the suspension are numerous and it is especially adopted for use on heavy duty trucks and truck-tractors. It provides desirable safety, ride, and economic features. Operating safety results from isolating the spring from braking and horizontal axle positioning forces, and by making axle caster and camber angles independent of spring displacement. Desirable ride qualities result from low unsprung weight and easily changed springs which can be tailored to the vehicle. Operating economy results from low overall weight which allows greater payloads in commercial vehicles, and the simplicity of the design will produce low maintenance costs.

It is understood that the forms of the invention herewithin shown and described are to be taken as preferred embodiments. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described my invention, I claim:

1. An independent steering axle suspension adapted for attachment to a vehicle frame, comprising, in combination, a frame bracket attached to said vehicle frame; a pin rigidly attached to said frame bracket, said pin having upper and lower ends extending above and below said attachment point to said frame bracket; a support member disposed to rotate about and rectilinearly translate reciprically along the upper and lower ends of said pin; a stub axle rigidly affixed to said support member; and a load spring placed below the lower end of said pin between said pin and said support member, said load spring contacting said support member at a position below the lower end of said pin.

2. The suspension recited in claim 1 further comprising a crossmember securely attached to said frame bracket.

3. The suspension recited in claim 1 further comprising a rebound spring placed above the upper end of said pin between said pin and said support member, said rebound spring contacting said support member at a position above the upper end of said pin.

4. The suspension recited in claim 1 further comprising a rebound spring placed above the upper end of said spring between said pin and said support member, said rebound spring contacting said support member at a position above the upper end of said pin, and a crossmember securely attached to said frame bracket.

5. The suspension recited in claim 1 wherein said pin is tubular, and further comprising a shock absorber assembly having a lower end and an upper end, said shock absorber assembly extending into said pin, the lower end of said shock absorber assembly affixed to the lower end of said pin, the upper end of said shock absorber assembly affixed to said support member at a position above the upper end of said pin.

6. The suspension recited in claim 1 wherein said pin is tubular, and further comprising a shock absorber assembly having a lower end and an upper end, said shock absorber assembly extending into said pin, the lower end of said shock absorber assembly affixed to the lower end of said pin, the upper end of said shock absorber assembly affixed to said support member at a position above the end of said pin, and a crossmember securely attached to said frame bracket.

7. The suspension recited in claim 1 wherein said pin is tubular, and further comprising a shock absorber assembly having a lower end and an upper end, said shock absorber assembly extending into said pin, the lower end of said shock absorber assembly affixed to the lower end of said pin, the upper end of said shock absorber assembly affixed to said support member at a position above the upper end of said pin, and a rebound spring placed above the upper end of said pin between said pin and said support member, said rebound spring contacting said support member at a position above the upper end of said pin.

8. The suspension recited in claim 1 wherein said pin is tubular, and further comprising a shock absorber assembly having a lower end and an upper end, said shock absorber assembly extending into said pin, the lower end of said shock absorber assembly affixed to the lower end of said pin, the upper end of said shock absorber assembly affixed to said support member at a position above the upper end of said pin, a rebound spring placed above the upper end of said pin between said pin and said support member, said rebound spring contacting said support member at a position above the upper end of said pin, and a crossmember securely attached to said frame bracket.

* * * * *